United States Patent
Benavides Pérez et al.

(10) Patent No.: US 10,633,721 B2
(45) Date of Patent: Apr. 28, 2020

(54) HYDROMETALLURGICAL PROCESS FOR THE RECOVERY OF COPPER, LEAD OR ZINC

(71) Applicant: MINERA PECOBRE, S.A. DE C.V., Torreón, Coahuila (MX)

(72) Inventors: Ricardo Benavides Pérez, Torreón (MX); Isaías Almaguer Guzmán, Torreón (MX); David Ezequiel Vázquez Vázquez, Torreón (MX)

(73) Assignee: Penoles Tecnologia, S.A. DE C.V., Torreon, Coahuila (MX)

( * ) Notice: Subject to any disclaimer, the term of this patent is extended or adjusted under 35 U.S.C. 154(b) by 611 days.

(21) Appl. No.: 15/312,731

(22) PCT Filed: Jun. 12, 2014

(86) PCT No.: PCT/MX2014/000090
§ 371 (c)(1),
(2) Date: Jun. 14, 2017

(87) PCT Pub. No.: WO2015/178752
PCT Pub. Date: Nov. 26, 2015

(65) Prior Publication Data
US 2017/0306442 A1    Oct. 26, 2017

(30) Foreign Application Priority Data

May 21, 2014 (MX) .................. MX/A/2014/006162

(51) Int. Cl.
*C22B 3/00* (2006.01)
*C22B 3/04* (2006.01)
(Continued)

(52) U.S. Cl.
CPC ................ *C22B 19/22* (2013.01); *C01D 5/02* (2013.01); *C01D 5/16* (2013.01); *C01F 5/40* (2013.01);
(Continued)

(58) Field of Classification Search
CPC ........... C22B 3/04; C22B 11/04; C22B 13/04; C22B 19/20; C01D 5/02; C01D 5/16; C01F 5/40; C01G 28/02
See application file for complete search history.

(56) References Cited

U.S. PATENT DOCUMENTS 2,927,017 A * 3/1960 Orrin ........................ C22B 3/08
423/95
3,230,071 A * 1/1966 Orrin ........................ C22B 1/02
209/164
(Continued)

FOREIGN PATENT DOCUMENTS

CA          1160055 A1    1/1984
DE          2306773 A1 *  8/1973  ............... C01D 5/00

OTHER PUBLICATIONS

DE-2306773-A1 machine translation of the description (Year: 1973).*

*Primary Examiner* — Tima M. McGuthry-Banks
(74) *Attorney, Agent, or Firm* — Shumaker, Loop & Kendrick, LLP

(57) ABSTRACT

A hydrometallurgical process for the treatment of polymetallic ores and sulphide concentrates of copper and zinc, and by-products of lead and zinc from smelting plants, treated independently and/or as mixtures thereof, which contain relevant amounts of lead, copper, zinc, iron, gold and silver, such as the matte-speiss mixture of lead foundries, and copper cements from the purification processes of electrolytic zinc plants. The process allows the recovery of metallic copper, zinc, copper as copper and zinc basic salts, which may be hydroxides, carbonates, hidroxysulphates or mixtures thereof; the production of stable arsenic residues; and the effective and efficient recovery of Pb, Au and Ag as a concentrate of lead sulphide and/or lead, Au, and Ag sulphate.

13 Claims, 4 Drawing Sheets

(51) Int. Cl.
    *C01F 5/40*     (2006.01)
    *C01D 5/02*     (2006.01)
    *C01D 5/16*     (2006.01)
    *C01G 28/02*     (2006.01)

(52) U.S. Cl.
    CPC ............... C01G 28/02 (2013.01); C22B 3/04 (2013.01); C22B 11/04 (2013.01); C22B 13/04 (2013.01); *Y02P 10/214* (2015.11); *Y02P 10/234* (2015.11); *Y02P 10/236* (2015.11)

(56) References Cited

U.S. PATENT DOCUMENTS

| | | | |
|---|---|---|---|
| 3,911,078 A | | 10/1975 | Nadkarni et al. |
| 4,366,127 A | | 12/1982 | Rastas et al. |
| 4,405,569 A | * | 9/1983 | Dienstbach .......... C01G 28/023 423/101 |
| 5,993,635 A | | 11/1999 | Hourn et al. |
| 8,658,122 B2 | * | 2/2014 | Martinez Martinez .. C01D 5/00 23/302 T |
| 2002/0012621 A1 | | 1/2002 | Jones |
| 2007/0098609 A1 | * | 5/2007 | McConnell ............. C01G 1/12 423/34 |
| 2012/0328494 A1 | * | 12/2012 | Dreisinger ............. C22B 58/00 423/37 |

\* cited by examiner

HYDROMETALLURGICAL PROCESS FOR THE RECOVERY OF COPPER, LEAD OR ZINC

TECHNICAL FIELD OF THE INVENTION

The present invention relates to hydrometallurgical processes for the recovery of Cu, Pb and/or Zn from polymetallic minerals and sulphide concentrates, and by-products from lead smelting plants such as the matte-speiss mixture, with relevant valuables of gold and silver, and copper cements from the purification processes of electrolytic zinc plants, in particular, the process allows the recovery of the metals copper and zinc, such as copper and zinc basic salts, which can be hydroxides, carbonates, hydroxysulphates or mixtures thereof; the production of stable arsenic residues; and the effective and efficient recovery of Pb, Au and Ag as a concentrate of lead sulphide and/or lead, Au, and Ag sulphate.

BACKGROUND OF THE INVENTION

For more than two decades, renewed interest has emerged in the development of hydrometallurgical process technologies. The impetus of these developments is mainly due to the desire to develop a viable alternative for replacing Cu, Pb and Zn pyrometallurgical processes, and the existing perception of the advantages of developing these new processes, such as: (1) elimination of $SO_2$ emissions, (2) economically effective treatment of complex concentrates; and (3) lower capital costs.

Current hydrometallurgical process technologies for processing ores and concentrates of Cu, Pb, Zn and Fe are mainly based on leaching processes in sulphate, sulphate/chloride, and chloride media. In almost all the hydrometallurgical processes, copper and zinc are recovered using a combination of solvent extraction/electrowinning (SX/EW).

The sulphate media-based processes generally use oxygen as an oxidising agent, and draw on the participation of the ferrous/ferric pair in the oxidation-reduction reactions that play an important role in most of the processes. Fine grinding to less than 20 μm is also effective for increasing leaching kinetics. It is necessary to use leaching from atmospheric pressure to 1000 kPa, and temperatures ranging from room temperature to higher, to achieve leaching rates from hours to days, such as the case of bioleaching.

The processes that can summarise this behaviour are commercially known as Activox, Nenatech, Dynatec, AAC/UBC, Placer Dome process, Biocop, BacTech/Mintek and Geocoat, which are processes that range from laboratory scale up demonstration plants, almost all applied to concentrates and/or copper-based chalcopyrite ores. There are commercial plants for more leachable copper sub-types such as chalcocite, as in the case of Las Cruces in Spain and Mt. Gordon process in Australia.

Surfactants/additives can be used to prevent foaming. The recovery of noble metals from leaching residues containing sulphur is much more difficult. Particularly, when there is jarosite formation, gold recovery from total residues of oxidative leaching by cyanidation is high, but silver recovery is limited by silver jarosite formation. When there is $S°$, the difficulty lies in performing an efficient separation and leaving the waste with the lowest content of $S°$, thus giving rise to fewer limitations to either lead or copper for entering in foundries.

In sulphate/chloride-based processes, the sulphide sulphur is oxidised to $S°$. The incorporation of chloride to the leaching of the sulphate medium enhances leaching kinetics and allows lower leaching temperatures, but to obtain satisfactory extraction of copper and zinc it is necessary to incorporate high concentrations of chloride (greater than 10 g/l). A major difficulty is the recovery of noble metals from leaching residues containing $S°$ because this involves drying the residue, removing the $S°$ with an organic solvent, and performing pressurised leaching followed by cyanidation. In all cases, the lead contained in the waste is presented as anglesite.

In processes based on chloride (and bromide) media for complex sulphides, the kinetics are faster when operating at atmospheric pressure, almost all sulphides are oxidised to $S°$, with a greater solubility of metals leading to smaller volumes of solution in the following steps, and the energy required for electroplating chlorides can be reduced significantly with respect to the electrowinning of sulphates. However, capital costs and plant maintenance are relatively high because chloride solutions require special construction materials and, additionally, electrowinning directly from solutions of chlorides does not produce copper cathodes which is the accepted form of copper for sale. Silver can be recovered via cementation with copper, but gold recovery is difficult with direct cyanidation due to the $S°$. Pyrite is generally not significantly leached, meaning that the gold cannot be recovered if it is associated with the pyrite.

Despite the various developments in recent decades on the hydrometallurgical copper processes, there is still no operable commercial process for treating chalcopyrite concentrates, primarily because (1) the power requirements for leaching and electrowinning sulphates are higher than for modern smelting and electrorefining processes; (2) capital and operating costs are not well defined and are based on preliminary estimates that tend to underestimate the actual costs, therefore there are no commercial operations; (3) the technical risk for the development of any new process is very high; (4) the recovery of noble metals, especially silver from leaching residues, is difficult and recoveries are uncertain, especially from waste containing sulphur, and (5) the disposal of leaching waste is the main problem which limits hydrometallurgical processes in more remote areas. In all hydrometallurgical processes, sulphur potentially becomes an environmental liability, in $S°$ form it must be confined as waste with a high potential for acid generation, and in the case of the dilute sulphuric acid solutions produced by leaching, these must be neutralised to become stable non-hazardous waste before being confined.

The differences between some of the inventions that make up the state of the art and the present invention are described below.

Patent ES524825 (Broken Hill Associated Smelters Proprietary Limited, 1983), describes a process for the hydrometallurgical recovery of valuable amounts of metal from sulphide materials containing copper and/or other metals, which are treated in a solution containing chloride, with oxygen injection, at moderate pressure and temperature. In all cases where leaching is assisted by chlorides, the special materials used in the leaching process increase the capital costs.

Mexican patent MX246,361 (Outokumpu Oyj, 2007; International Application WO 0250319), describes a method for leaching a copper concentrate containing iron in a chloride medium to achieve an alkali-chloride/copper chloride solution, essentially free of iron, and the recovery of iron and elemental sulphur as a solid precipitate. Countercurrent leaching takes place at atmospheric pressure with a reaction time of at least 10 hours, and the iron is recovered as hematite. One disadvantage of the method claimed in this patent is a that the hydrometallurgical treatment is assisted by chlorides and chlorides used at small scales may be manageable but at larger scales handling chlorides becomes expensive due to maintenance requirements. Likewise, the high reaction times and the use of four reactors entails significant investments.

US Patent application published under No. 20090078086 (Outotec Oyj, 2009), describes a method for recovering copper from a copper sulphide ore containing pyrite, wherein the mineral is ground and leached in a solution containing sulphuric acid, under atmospheric conditions, by means of trivalent iron in situ. The leaching is performed in a closed reactor. Oxygen is introduced at the bottom of the reactor. Some differences between the process of the invention and said patent application are that, in the latter, no valuables are recovered and the conditions are at atmospheric pressure, whereas in the invention under this patent application, the recovery of metal valuables is claimed for copper, zinc, iron in their basic salts such as hydroxides, carbonates, hydroxysulphates or mixtures thereof, in addition to the fact that the leaching is carried out in a solid-gas-liquid (SGL) at low pressure with oxygen.

International Patent Application WO 2007077290A1 (Outotec Oyj, 2007) describes a method for improving the leaching of sulphide concentrates in a reactor where oxygen is introduced at the bottom of the reactor to a column to convert the ferrous ion to ferric ion, which is then reused. A difference with the process claimed by the invention presented is that in this international application the ferrous ion is oxidised outside the reactor, whereas in this invention, the ferrous ion is added and oxidised in the same tank and converted to ferric ion through an efficient conversion of the ferrous/ferric pair to assist the oxidation of the sulphurous materials, in addition to quasi-stoichiometric oxygen utilisation. Also, in the process claimed by Outotec, the recovery of noble metal valuables is not an object of the invention, since the leaching residues are not processed for the economic recovery of Pb, Au and Ag, in contrast to the subject-matter claimed by the present patent application.

Australian Patent AU2006201600B2 (Western Minerals Technology Pty. Ltd. 2006) describes a method for processing a copper mineral (chalcocite, chalcopyrite, etc.), wherein the copper ore is activated via grinding at P80 between 2-20 microns followed by an oxidative hydrometallurgical treatment in the presence of chloride ions (2-10 g/L). Capital and plant maintenance costs are relatively high because chloride solutions require special construction materials. Work at high pressure (1000 kPa) also means higher capital costs.

OBJECTS OF THE INVENTION

One object of the present invention is to disclose a novel hydrometallurgical process for the treatment of polymetallic ores and sulphide concentrates of copper and zinc, and by-products of lead and zinc from smelting plants, treated independently and/or as mixtures thereof, which contain relevant amounts of lead, copper, zinc, iron, gold and silver, such as the matte-speiss mixture of lead foundries, and copper cements from the purification processes of electrolytic zinc plants. The predominant varieties in these materials may consist of chalcopyrite, covellite, chalcocite, pyrite, sphalerite, arsenopyrite, enargite, metallic copper, and copper and zinc cements.

Another object of the present invention is to provide a hydrometallurgical process that allows the recovery of metallic copper and zinc, as copper and zinc basic salts, which may be hydroxides, carbonates, hydroxysulphates or mixtures thereof.

Yet another object of the present invention is to provide a hydrometallurgical process that allows stable production of arsenical wastes.

Still Another object of the present invention is to provide a hydrometallurgical process that enables the effective and efficient recovery of Pb, Ag and Au as a concentrate of lead sulphide and/or lead, Ag, and Au sulphate.

Other objects and advantages of the present invention may become apparent from examining the following description and accompanying figures which are provided exclusively for illustrative and not limiting purposes.

DETAILED DESCRIPTION OF THE INVENTION

Figure 1:
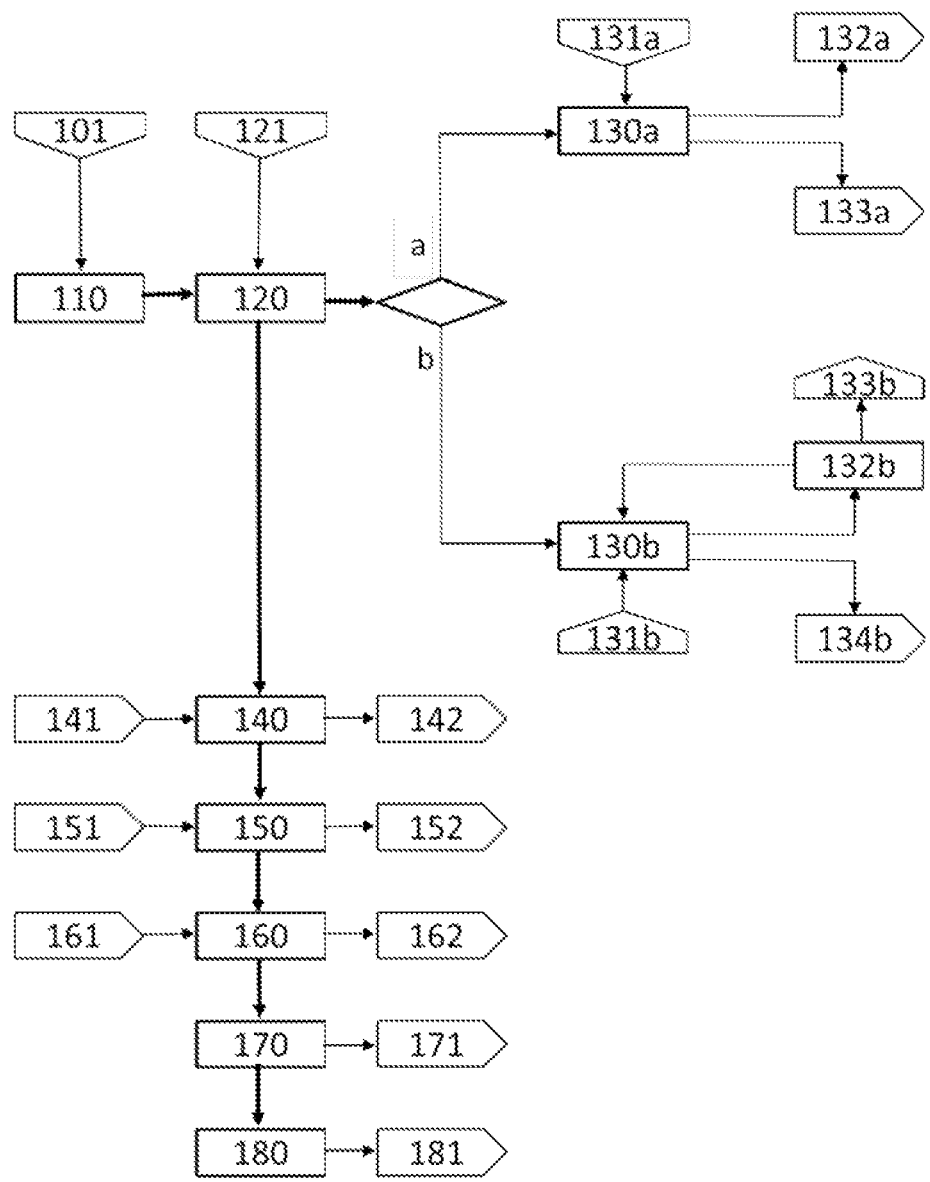
FIG. 1 is a schematic diagram of the hydrometallurgical process for the recovery of Pb and Cu and/or Zn.

The hydrometallurgical process proposed for the recovery of Cu and Pb and/or Zn is schematically illustrated in the block diagram of FIG. 1, formed by the stages described below:

Stage 1. Grinding (110)

The raw material (101), which consists of polymetallic Cu and Zn ores, sulphide Cu and Zn concentrates, by-products of Pb foundries and by-products from Zn processing plants are subjected to dry grinding (110) to a particle size of less than 44 microns. Then, the material resulting from the grinding is sent for leaching (120).

Stage 2. Leaching (120)

The material resulting from grinding (110) is fed to a solid-gas-liquid reactor (SGL) to be leached (120) at low pressure with oxygen (less than 25 psia) to obtain a residue containing lead sulphate, silver and gold with elemental sulphur ($PbSO_4$—$Ag/Au+S°$), which is sent for value recovery (130), and a solution containing either copper, zinc, arsenic and iron, or mixtures thereof in sulphuric acid medium, which in turn is sent for purification (140), to obtain an extraction of copper and zinc greater than 95% and extraction of arsenic of at least 80%.

The operation is batch type, the reactor contains high acidity solution of not less than 300 g/l $H_2SO_4$, a ratio of iron II/metal in solution of less than 2, and a surfactant to regulate the surface tension, keeping the reactor pressure constant with partial oxygen pressure less than 30 psia, with agitation ensuring efficient contact between the solid-liquid-gas, at a temperature of less than 100° C., and reaction time of less than 9 hours, achieving a quasi-stoichiometric utilisation of oxygen and efficiency above 95%.

The leaching operation has an initial solids concentration of 500 g/l, and is performed in a pressurised tank, where the initial partial oxygen pressure (Pp $O_2$) ranges from 5 to 30 lb/in$^2$.

Stage 3. Purification of the Iron and Arsenic Leaching Solution (140)

The purification of the iron and arsenic leaching solution, which further contains either copper and/or zinc or mixtures thereof, allows a purified solution of $CuSO_4$ and/or zinc sulphate and magnesium sulphate to be obtained, which is sent to precipitation of basic salts (150), and elimination of As through a stable residue, $FeAsO_4$ (142).

For the removal of As content in the leaching solution, this is precipitated as ferric arsenate by neutralising the free acidity with a suspension of any of the neutralisers (141) such as sodium hydroxide (NaOH), sodium carbonate ($Na_2CO_3$), magnesium oxide (MgO), magnesium hydroxide [$Mg(OH)_2$] and/or calcium hydroxide [$Ca(OH)_2$], to an adjusted pH value of between 2 to 5, so as to ensure the chemical stability of the residue. The As is removed through a stable residue, $FeAsO_4$ (142).

Stage 4. Recovery of Gold and Silver Valuables (130a or 130b)

There are two alternatives for removing the S° from the $PbSO_4$—Ag/Au+S° residue obtained from the leaching process (120):

(a) A first alternative for the recovery of gold and silver valuables (130a), uses $Na_2S$ (131a). The S° in the $PbSO_4$—Ag/Au+S° residue obtained from leaching (120), is converted to polysulphides ($Na_xS_y$) in a solution of sodium sulphide ($Na_2S$) in two countercurrent stages, forming a solution of $Na_2SO_4$ (133a). Furthermore, the $PbSO_4$ from the $PbSO_4$—Ag/Au+S° residue obtained from the leaching (120) is converted to lead sulphide (PbS), generating a synthetic galena concentrate rich in Au and Ag (132a) that is sent to the Lead Smelting Plant for subsequent processing. The excess sulphur is purged as a solution of $Na_2SO_4$ (133a), and the extraction rate of S° ranges from 95% to 99%. The recovery of Ag and Au valuables, contained mainly in the synthetic galena (lead sulphide, PbS), stands at around 99%, with S° content of less than 1%, and a reaction conversion of $PbSO_4$ to PbS of over 99%.

(b) A second alternative for the recovery of gold and silver valuables (130b), uses $C_2Cl_4$ (131a). The S° in the $PbSO_4$—Ag/Au+S° residue obtained from leaching (120), and the tetrachloroethylene ($C_2Cl_4$) form a solution (132b), subsequently separated by cooling the S° (133b) and the tetrachloroethylene is recovered for recycling back to the process (130b). Furthermore, a $PbSO_4$ residue is generated containing Au and Ag (134b) that is sent to the Lead Smelting Plant for further processing.

Stage 5. Precipitation of Basic Salts (150)

The purified solution of $CuSO_4$ and/or zinc sulphate and magnesium sulphate coming from the purification of the leaching solution (140) is precipitated as copper and/or zinc basic salts (152) with a neutralising agent (151), such as preferably sodium hydroxide (NaOH), sodium carbonate ($Na_2CO_3$), magnesium oxide (MgO) and/or magnesium hydroxide $Mg(OH)_2$, resulting in a solution containing mainly magnesium sulphate ($MgSO_4$) and/or sodium sulphate ($Na_2SO_4$) with traces of heavy metals (such as Cu, Cd, Co and Mn) to be purified subsequently (160), and, on the other hand, copper and/or zinc basic salts are obtained (152) which can be copper or zinc hydroxide [$Cu(OH)_2$ or $Zn(OH)_2$], copper or zinc carbonate ($CuCO_3$ or $ZnCO_3$), copper or zinc hydroxysulphate [$Cu_4SO_4(OH)_6$ or $Zn_4SO_4(OH)_6$], or mixtures thereof.

Stage 6, Purification of the Magnesium Sulphate or Sodium Sulphate Solution (160)

The purification (160) of the magnesium sulphate or sodium sulphate solution with traces of heavy metals obtained from the precipitation of basic salts (150), generates diluted magnesium sulphate solution ($MgSO_4$) and/or sodium sulphate solution ($Na_2SO_4$) and ensures the elimination of traces of heavy metals through the use of sodium sulphide (161) converting the heavy metals (such as Cu, Cd, Ca, and Mn) into their respective sulphides (162).

Stage 7. Water Recovery (170)

For water recovery (170), the diluted magnesium sulphate or sodium sulphate solution obtained from the purification of the $MgSO_4$ and/or $Na_2SO_4$ solution undergoes a concentration process that allows the recovery of water (171) in percentages above 70%, and resulting in a saturated solution of magnesium or sodium sulphate which subsequently undergoes crystallisation (180).

Stage 8. Crystallisation of the Magnesium Sulphate or Sodium Sulphate Salt (180)

The saturated magnesium or sodium sulphate solution obtained in the water recovery (170), is sent a crystallisation process (180) to obtain $MgSO_4$ salts (such as $MgSO_4 \cdot 7H_2O$) or hydrated $Na_2SO_4$ salts (181).

This invention is additionally described through the following examples that should not be considered to be limiting, which detail the preferred modalities.

EXAMPLE 1

Figure 2:
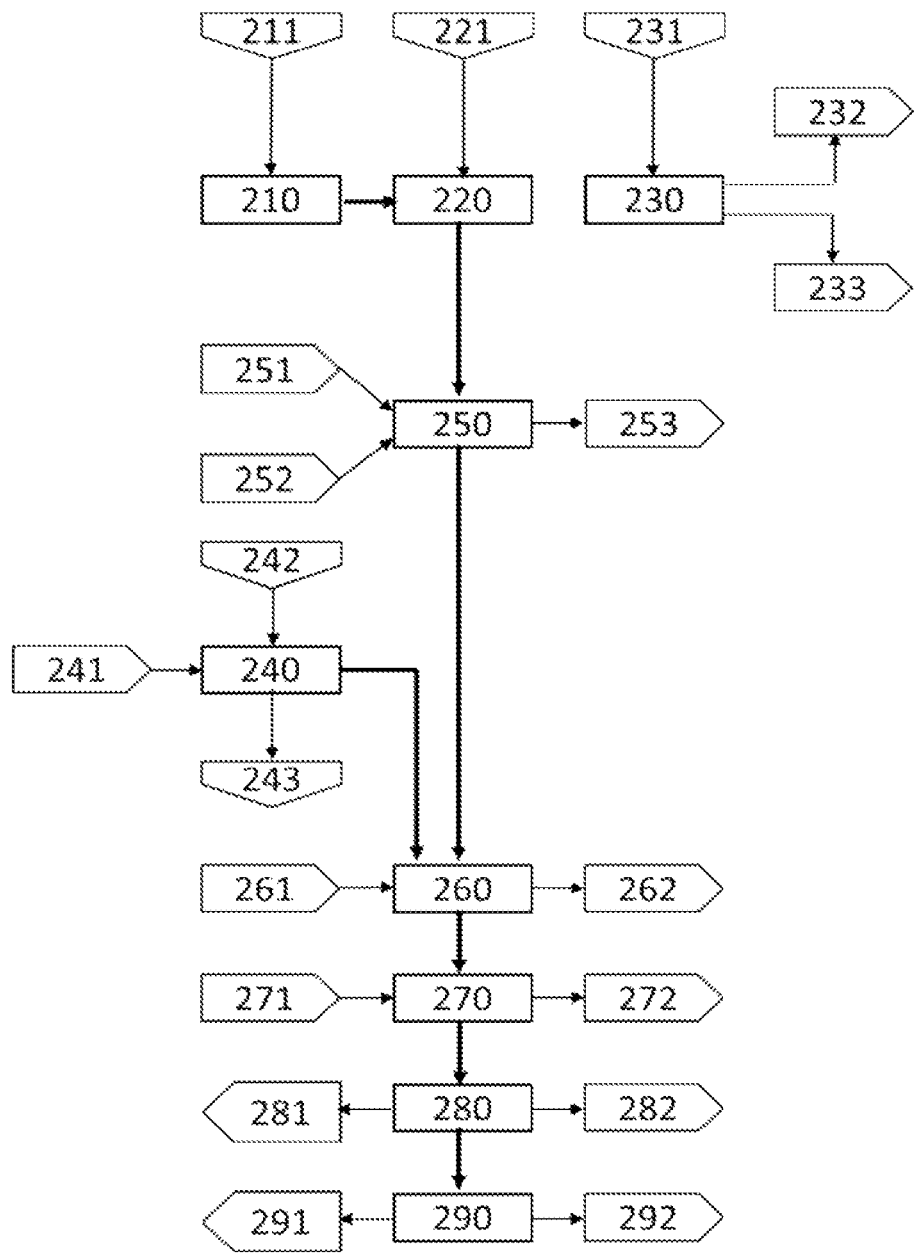
FIG. 2 shows a graphical representation of the hydrometallurgical process for treating matte-speiss material ($Cu_2S$—$Cu_3As$) from a lead foundry, and copper cements from an electrolytic zinc plant.

Hydrometallurgical Process for Treating Matte-Speiss Material ($Cu_2S\ Cu_3As$) from a Lead Foundry, and Copper Cements from an Electrolytic Zinc Plant FIG. 2 shows the schematic block diagram of the hydrometallurgical treatment process of matte-speiss material ($Cu_2S$—$Cu_3As$) from a lead foundry, and copper cements from an electrolytic zinc plant, where each stage of the invention's hydrometallurgical process (FIG. 1) is renumbered for the specific application conditions of this example, as follows:

Stage 1. Grinding (210)

Matte-speiss material (211) containing 40.13% copper, 20.40% lead, 10.5% total sulphur, 6.73% iron and 4.22% arsenic is subjected to (210) dry grinding until obtaining a particle size $P_{90}$ of 45 microns. Then, the resulting matte-speiss material is sent for leaching (220).

Stage 2a. Leaching of the Matte-Speiss Material (220)

A sample of 4.310 g of matte-speiss material from the grinding (210), with a particle size P90 of 46 microns, is mixed with an acid solution (221) containing 5 g/l of iron as iron sulphate, 18 g of a reactive surfactant, and 180 g/l of free acidity. The reactor (221) is closed and kept at a partial oxygen pressure of 12 lb/in$^2$, the reaction temperature is 90° C. and it is allowed to react for 7 hours. Subsequently, the suspension is filtered and the residue is rinsed with water, obtaining 1.745 g of solids containing 0.79% copper; 39.81% lead; 2.15% silver; 0.96% iron; 3.08% arsenic and 12% elementary sulphur, which is sent to valuables recovery (230). The end solution contains 80 g/l copper; 12.98 g/l total iron; 10.04 g/l arsenic and 60 g/l free sulphuric acid, which is sent for purification (250). Table 1 shows the extraction of copper as a function of leaching time.

TABLE 1

Extraction of copper as a function of leaching time

| TIME (hr) | EXTRACTION (%) |
|---|---|
| 0 | 0.0 |
| 0.5 | 48.6 |
| 1 | 67.3 |
| 1.5 | 74.0 |
| 2 | 80.8 |
| 3 | 88.6 |
| 4 | 94.9 |
| 5 | 95.5 |
| 6 | 96.7 |
| 7 | 99.2 |

Other applications of this stage of leaching may be the leaching of concentrates of copper based on chalcopyrite (Example 2), or concentrates of zinc based on sphalerite (example 3), which are described below.

The following steps, which are described below relating to Example 1, if required, can be applicable to leaching of copper concentrates based on chalcopyrite, as described in Example 2, as well as the leaching of zinc concentrates based on sphalerite, as described in Example 3.

Stage 2b. Leaching of Copper Cements (240)

A sample of 3.372 g of copper cement from the electrolytic zinc plant (241), containing 65.29% copper, 4.78% lead, 4.23% zinc, 1.92% cadmium, and 0.46% cobalt, is added to a solution composed of 24.3 litres of an acid solution (242) that contains 141 g/l of sulphuric acid, to be leached in another SGL reactor different to the reactor where matte-speiss material was leached. The reactor (241) is closed and kept at a partial oxygen pressure of 12 lb/in$^2$, the reaction temperature is 90° C. and it is allowed to react for 2 hours. After the reaction time, the suspension is filtered and the residue is rinsed with water, obtaining 362 g of end solids containing 3.71% copper, 44.05% lead, 0.42% zinc, 0.09% cadmium and 0.014% cobalt, which is sent to valuables recovery (230). The end solution contains 100 g/l copper, 0.28 lead, 6.16 g/l zinc, 2.58 g/l cadmium and 0.66 g/l cobalt, which is sent to precipitation of basic salts (260). Table 2 shows the extraction of copper according to leaching time.

TABLE 2

Copper extraction according to leaching time of the hydrometallurgical treatment process for copper cements

| TIME (hr) | EXTRACTION (%) |
|---|---|
| 5 | 49.8 |
| 15 | 54.7 |
| 30 | 68.5 |
| 45 | 83.0 |
| 60 | 81.9 |
| 75 | 95.4 |
| 90 | 98.0 |
| 120 | 99.6 |

Stage 3. Purification of the Leaching Solution for Arsenic Precipitation with Ca(OH)$_2$ (250)

To a sample of 1 l of the end solution from the leaching of the matte-speiss material (220), containing 80 g/l copper, 12.98 g/l total iron, 10.04 g/l arsenic and 60 g/l free sulphuric acid, and pH=0.2, 2 ml of hydrogen peroxide is added (251), stirring slowly for 15 minutes, to ensure an oxidation-reduction potential greater than 0.77 V. After this time, 220 ml of a suspension of calcium hydroxide is added (252) containing 300 g/l of Ca(OH)$_2$, and/or to reach a pH value of 2.6 to 2.8, and allowed to react for 60 minutes. Following the reaction time, the suspension is filtered and the residue is rinsed with water, obtaining 137.34 g of end solids (252) with 0.60% copper, 5.83% iron and 5.68% arsenic. The end solution contains 70.86 g/l copper; 2.68 g/l total iron; 0.048 g/l arsenic and 0-16 g/l of free sulphuric acid, which is sent for precipitation of basic salts (260).

Another application of the purification stage (250) of the end solution from the leaching of the matte-speiss material for arsenic precipitation can be the use of MgO as neutralising agent, rather than adding calcium hydroxide (251). This alternative corresponds to Example 4 described below.

Stage 4. Recovery of Valuables (230)

The solid obtained from the matte-speiss leaching (220) is combined with the final solid retrieved from the copper cement leaching (240) for the recovery of valuables (230).

A sample of 244 g of the mixture of the solids obtained in the matte-speiss and copper cement leaching processes (220 and 240), containing 0.79% copper, 39.81% lead, 2.15% silver, 0.96% iron, 3.08% arsenic and 12% elemental sulphur, is leached with 0.810 l of a sodium sulphide solution (231) containing 49.172 g/l of sodium in sodium sulphide form, and allowed to react (231) for 1 hour at a temperature of 70-80° C. Following this reaction time, the suspension is filtered, obtaining 210 g of solids (232) containing 53.6% lead, 2.59% silver, 3.69% arsenic; and 0.01% elemental sulphur. Whereby the main type of lead is lead sulphide. The resulting solution (233) contains 31.02 g/l sodium; 44 g/l total sulphur and 1.89 g/l antimony.

Stage 5. Precipitation of Basic Salts (260)

The end solution from the purification of the leaching solution (250) together with the end solution from the cement leaching process (240) go on to the basic salt precipitation stage.

A sample of 21.65 l of the mixture of the end solutions obtained from the purification of the leaching solution (250) and the copper cement leaching process (240), with a content of 57 g/l copper, 2.71 g/l calcium, 2.38 g/l zinc, 1.32 g/l iron, 1.13 g/l sodium, 0.4 g/l cadmium and 0.23 g/l magnesium heated at between 70 and 80° C., to which 888 g of magnesium oxide is added (261) with a particle size P90 of 44 microns and/or until reaching a final pH of the suspension between 6.5 to 7.5 and allowed to react for 7 hours. The suspension is filtered and the residue is rinsed with water, obtaining 2.580 g of end solids containing 48% copper, 3.9% sodium, 1.85% zinc, 1.0% iron and 0.03% cadmium. The end solution contains 24 g/l magnesium, 1.83 g/l calcium, 1.02 g/l sodium, 0.16 g/l zinc and 0.07 g/l cadmium, which is sent for purification (270).

Stage 6. Purification of the Magnesium Sulphate Solution (270)

A sample of 24 l of an end of solution magnesium sulphate obtained from the precipitation of basic salts (260), with a content of 24 g/l magnesium, 1.84 g/l calcium, 1.13 g/l sodium, 0.17 g/l zinc, 0.07 g/l cadmium and 0.05 g/l cobalt, to which 0.28 l of a solution of sodium sulphide is added (272) with a concentration of 83 g/l of $Na_2S$ is allowed to react for 60 minutes, after which time the suspension is filtered and the residue is rinsed with water, obtaining 10 g of solids (272) containing 34% zinc, 14% cadmium and 9.57% cobalt. The end solution contains 23.88 g/l magnesium, 1.87 g/l calcium, 1.67 g/l sodium, <1 ppm zinc, <1 ppm cadmium and <1 ppm cobalt, which is sent for water recovery and calcium removal (280).

Stage 7. Water recovery and calcium removal (280)

A sample of 24.28 l of an end solution of magnesium sulphate obtained from the purification of the magnesium sulphate solution (270), with a content of 23.88 g/l magnesium, 1.87 g/l calcium, 1.67 g/l sodium, <1 ppm zinc, <1 ppm cadmium and <1 ppm cobalt is taken to evaporation point until the magnesium sulphate saturation point is reached (77.9 g/l). The recovered water (281) amounts to 16.56 l. The resulting suspension is filtered and the residue is rinsed with water, obtaining 10 g of final solids (282) with 29.45% Ca. The end solution contains 77.9 g/l magnesium, 0.53 g/l calcium, 5.49 g/l sodium, <1 ppm zinc, <1 ppm cadmium and <1 ppm cobalt, which is sent for crystallisation (290).

Stage 8. Crystallisation of the Magnesium Sulphate Heptahydrate Salt (290)

A sample of 7.44 l of an end solution of magnesium sulphate obtained from the water recovery and calcium removal process (280), with a content of 77.9 g/l magnesium, 0.53 g/l calcium, 5.49 g/l sodium, <1 ppm zinc, <1 ppm cadmium and <1 ppm cobalt is subjected to a crystallisation process (290). The resulting suspension is filtered, obtaining 312 g of solids (291) in magnesium sulphate heptahydrate form with a purity of 99.95% containing 9.84% magnesium and 0.008 manganese, 0.098 sodium and 0.002 selenium. The end solution contains 46.6 g/l magnesium, 0.64 g/l calcium, 6.82 g/l sodium, <1 ppm zinc, <1 ppm cadmium and <1 ppm cobalt.

EXAMPLE 2

Figure 3:
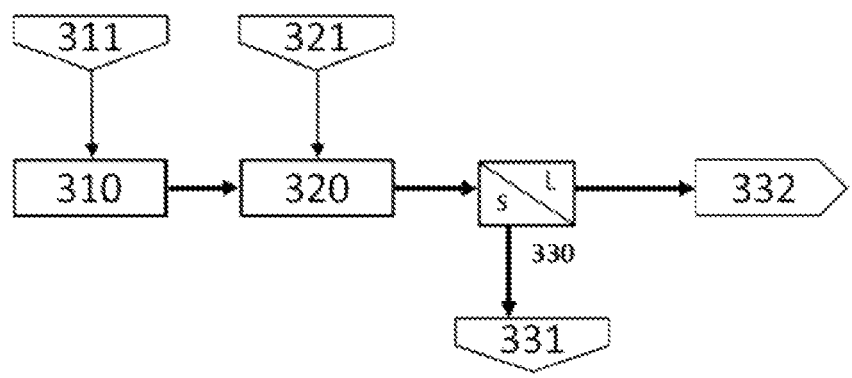
FIG. 3 corresponds to a graph indicating the leaching stage of the hydrometallurgical process for treating chalcopyrite-based copper concentrates.

Leaching Stage of the Hydrometallurgical Process for Treating Chalcopyrite-Based Copper Concentrates FIG. 3 shows a block diagram of the grinding and leaching stages of the hydrometallurgical process for treating chalcopyrite-based copper concentrates, where:

A sample of 999 g of a chalcopyrite concentrate (311) containing 19.80% copper, 10.20% zinc, 20.30% iron and 28.60% of total sulphur, is subjected to grinding (310) to obtain a particle size P80 of 15 microns, the resulting material is sent to leaching (320) where the sample is mixed with 16.5 l of a solution (321) containing 11.50 g/l iron as ferrous sulphate and 64.7 g/l free sulphuric acid. The reactor (321) is closed and kept at a partial oxygen pressure of 12 lb/in², the reaction temperature is 80° C. and it is allowed to react for 8 hours, the redox potential during this reaction time is maintained between 400 and 500 my with respect to the Ag/AgCl electrode.

Subsequently, the suspension is filtered (330) and the residue is rinsed with water, obtaining 402.1 g of end solids (331) with 4.80% copper, 2.1% zinc, 5.7% iron and 50.0% sulphur, and 16.5 l of an end solution (332) with 10.8 g/l copper, 5.1 g/l zinc, 21.7 g/l total iron (12.3 g/l as iron +3) and 12.3 g/l free sulphuric acid. Table 3 shows the extraction of zinc according to leaching time.

TABLE 3

Extraction of copper according to leaching time, for the case of the treatment of chalcopyrite-based copper concentrates

| TIME (hr) | EXTRACTION (%) |
|---|---|
| 1 | 57.9 |
| 2 | 75.2 |
| 3 | 79.0 |
| 4 | 81.8 |
| 5 | 82.0 |
| 6 | 83.1 |
| 7 | 86.6 |
| 8 | 91.0 |

EXAMPLE 3

Figure 4:
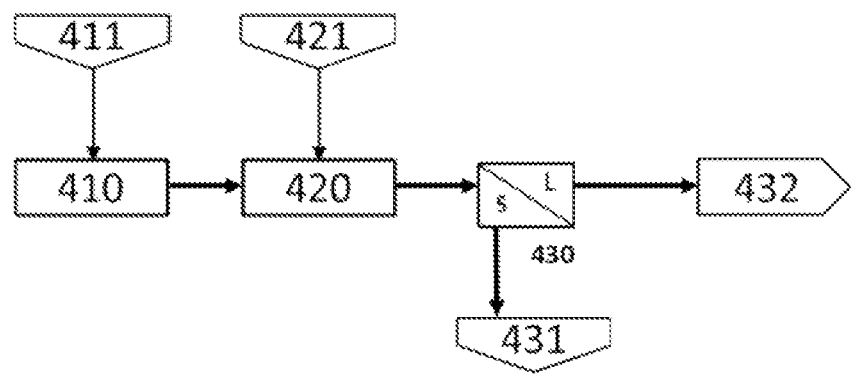
FIG. 4 is a diagram of the leaching stage of the hydrometallurgical process for treating sphalerite-based zinc concentrates.

Leaching Stage of the Hydrometallurgical Process for Treating Sphalerite-Based Zinc Concentrates FIG. 4 shows a block diagram of the leaching stages of the hydrometallurgical process for treating sphalerite-based zinc concentrates, where:

A sample of 262 g of a concentrate of zinc (411) containing 48.5% zinc, 12.39% iron and 34.6% of total sulphur, is subjected to grinding (410) to obtain a particle size $P_{90}$ of 45 microns, the material retrieved is sent to leaching (420) where the sample is mixed with 239 g zinc ferrite (421) containing 19.8% zinc, 25% of total iron and 21.6% as iron (+3). This material mixture is added to a solution (421) composed of 0.4 l water, 0.043 l sulphuric acid at 98% purity and 3.070 l zinc sulphate solution containing 36.50 g/l zinc as zinc sulphate and 165.6 g/l free sulphuric acid.

The reactor (421) is closed and kept at a partial oxygen pressure of 12 lb/in², the reaction temperature is 90° C. and it is allowed to react for 14 hours, the redox potential during this reaction time is maintained between 400 and 500 my with respect to the Ag/AgCl electrode.

Subsequently, the suspension is filtered (430) and the residue is rinsed with water, obtaining 125 g of end solids (431) with 0.7% zinc, 5.1% iron and 71.2% sulphur, and 3.5 l of an end solution (432) with 79.50 g/l zinc, 24.2 g/l total iron and 24 g/l free sulphuric acid. Table 4 shows the extraction of zinc as a function of leaching time.

TABLE 4

Extraction of zinc as a function of leaching time, for the case of the treatment of sphalerite-based copper concentrates

| TIME (hr) | EXTRACTION (%) |
|---|---|
| 1 | 38.6 |
| 2 | 49.2 |
| 4 | 70.0 |
| 5 | 75.0 |
| 6 | 83.4 |
| 8 | 97.2 |
| 10 | 98.5 |
| 14 | 99.3 |

EXAMPLE 4

Purification Stage of the Leaching Solution for Arsenical Precipitation with MgO in the Hydrometallurgical Process for Treating Matte-Speiss Material ($Cu_2S$—$Cu_3As$)

Figure 5:
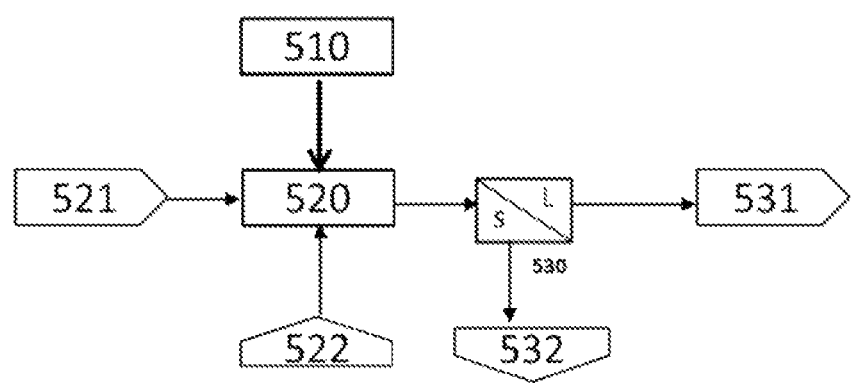
FIG. 5 corresponds to a graph showing the purification stage of the leaching solution for arsenical precipitation with MgO in the p hydrometallurgical process for treating matte-speiss material ($Cu_2S$—$Cu_3As$).

FIG. 5 shows the block diagram of the purification of the iron and arsenic leaching solution from the hydrometallurgical treatment leaching process of matte-speiss material ($Cu_2S$—$Cu_3As$), where:

A sample of 1 l of the end solution from the leaching of the matte-speiss material (510), containing 73.12 g/l copper, 13.84 g/l total iron, 9.14 g/l arsenic and 60 g/l free sulphuric acid, is sent to purification (520), where 2 ml of hydrogen peroxide is added (521), stirring slowly for 15 minutes, to ensure an oxidation-reduction potential greater than 0.77 V. After this time, 50 g MgO is added (521) with a particle size of −350 mesh (less than 49 microns), with a magnesium content of 60% and 0.013% total iron, and/or until reaching a pH value of 2.6 to 2.8, and allowed to react for 60 minutes. Following the reaction time, the suspension is filtered (530) and the residue is rinsed with water, obtaining 70 g of end solids (252) with 9.64% copper, 17.61% iron and 11.84% arsenic. The end solution (532) contains 67 sodium; 0.06 g/l total iron and 0.002 arsenic.

It may be seen that the above examples show some of the preferred modalities for implementing the invention, and it will be apparent to the person skilled in the art that a number of possible variations can exist to the process object of the present invention, based mainly, in the compositions of the raw material that will be processed; these variations, however, do not depart from the scope of this invention and should be considered to the light of the following claims.

Having described the invention, what is considered to be novel, and therefore is claimed as property, is contained in the following claims:

1. A hydrometallurgical process for treatment of polymetallic ores and sulfide concentrates of copper and zinc, by-products of lead and zinc from smelting plants, or mixtures thereof having a content of lead, copper, zinc, iron, arsenic, gold and silver, wherein the hydrometallurgical process comprises:
grinding a raw material to a particle size of less than 44 microns;
leaching the ground raw material by feeding to a solid-gas-liquid (SGL) reactor with oxygen of less than 30 psia and an acid solution so as to obtain a residue containing lead sulfate, silver and gold with elementary sulfur ($PbSO_4$—Ag/Au+$S°$) and a solution containing copper, zinc, arsenic and iron in a sulfuric acid medium;
purifying the leaching solution by neutralizing residual acidity in the leaching solution;
recovering gold and silver from the leaching residue by eliminating $S°$ in the residue;
precipitating copper or zinc basic salts from the purified solution with a neutralizing agent so as to obtain a solution containing magnesium sulfate and/or sodium sulfate with heavy metals, and basic salts of copper or zinc;
purifying the precipitated solution containing magnesium sulfate and/or sodium sulfate so as to produce a diluted solution of sodium sulfate and/or magnesium sulfate and removing heavy metals therefrom;
concentrating the diluted solution of sodium sulfate and/or magnesium sulfate so as to recover water and to obtain a saturated solution of magnesium sulfate and/or sodium sulfate; and
crystallizing magnesium sulfate and/or sodium sulfate salts from the saturated solution of magnesium sulfate and/or sodium sulfate so as to obtain hydrated salts of magnesium sulfate and/or sodium sulfate respectively.

2. The hydrometallurgical process of claim 1, wherein the step of purifying the leaching solution comprises:
eliminating arsenic as a stable residue of ferric arsenate.

3. The hydrometallurgical process of claim 2, wherein the step of eliminating comprises:
neutralizing the free acidity of the leaching solution with a suspension of a neutralizing agent, the neutralizing agent selected from the group consisting of sodium hydroxide, sodium carbonate, magnesium oxide, magnesium hydroxide, and calcium hydroxide; and
adjusting a pH of the neutralized leaching solution to a value of between 2 and 5 so as to stabilize the residue.

4. The hydrometallurgical process of claim 1 wherein the precipitated copper or zinc basic salts are selected from the group consisting of copper or zinc hydroxide, copper or zinc carbonate, copper or zinc hydroxy sulfate, and combinations thereof.

5. The hydrometallurgical process of claim 1, wherein the neutralizing agent used in the precipitation step is selected from the group consisting of sodium hydroxide, sodium carbonate, magnesium oxide, magnesium hydroxide and calcium hydroxide.

6. The hydrometallurgical process of claim 1, wherein the step of purifying precipitated solution containing magnesium sulfate and/or sodium sulfate comprises:
adding a sodium sulfide solution to the precipitated solution so as to convert the heavy metals into respective sulfides thereof.

7. The hydrometallurgical process of claim 1, wherein the hydrometallurgical process is a batch process, wherein the step of leaching is in a reactor that contains a solution of high acidity of not less than 300 g/L of $H_2SO_4$ and in which a relation of iron II/As in solution is at least 2, wherein a pressure in the reactor is constant to a partial oxygen pressure of less than 30 psia, and the step of leaching being at a temperature of less than 100° C. and at a reaction time of less than 9 hours.

8. The hydrometallurgical process of claim 1, wherein an initial oxygen pressure in the step of leaching is from 5 to less than 30 psia.

9. The hydrometallurgical process of claim 1, wherein an initial solids concentration in the step of leaching is up to 500 g/L.

10. The hydrometallurgical process of claim 1, wherein the step of recovering gold and silver comprises:
converting lead sulfate in the leaching residue to lead sulfide; and
integrating the lead sulfide into a synthetic galena concentrate containing the gold and silver.

11. The hydrometallurgical process of claim 10, wherein the step of recovering the gold and silver further comprising:
purging $S°$ as a solution of $Na_2SO_4$.

12. The hydrometallurgical process of claim 1, wherein the step of recovering gold and silver comprises:
dissolving a residue of $PbSO_4$—Ag/Au+$S°$ in two countercurrent stages in a solution of sodium sulfide so as to eliminate the $S°$ and to convert the lead sulfat into lead sulfide so as to produce a synthetic galena concentrate containing gold and silver.

13. The hydrometallurgical process of claim 1, wherein the step of recovering gold and silver comprises;
   dissolving the S° in tetrachloroethylene so as to produce a residue of $PbSO_4$ with gold and silver, wherein the S° remains dissolved in the $C_2Cl_4$;
   separating the S° by cooling; and
   recovering the $C_2Cl_4$.

* * * * *